United States Patent
Vaynberg et al.

(10) Patent No.: US 6,981,377 B2
(45) Date of Patent: Jan. 3, 2006

(54) SYSTEM AND METHOD FOR GENERATION OF ELECTRICITY AND POWER FROM WASTE HEAT AND SOLAR SOURCES

(75) Inventors: Mikhail Vaynberg, San Francisco, CA (US); Hans Gunter Horn, Cupertino, CA (US); Ralf Horn, Los Gatos, CA (US); Alfons Weiland, San Jose, CA (US); Richard A. Azevedo, Gilroy, CA (US)

(73) Assignee: Outfitter Energy INC, San Jose, CA (US)

( * ) Notice: Subject to any disclaimer, the term of this patent is extended or adjusted under 35 U.S.C. 154(b) by 0 days.

(21) Appl. No.: 10/374,581

(22) Filed: Feb. 24, 2003

(65) Prior Publication Data

US 2005/0183421 A1    Aug. 25, 2005

Related U.S. Application Data

(60) Provisional application No. 60/360,072, filed on Feb. 25, 2002.

(51) Int. Cl.
 *B60K 16/00* (2006.01)
(52) U.S. Cl. ................. 60/641.8; 60/641.11; 60/641.15
(58) Field of Classification Search ............... 60/641.8, 60/641.11, 641.15, 676
 See application file for complete search history.

(56) References Cited

U.S. PATENT DOCUMENTS

| 3,786,901 A | * | 1/1974 | Randell ................... 184/6.18 |
| 3,990,245 A | | 11/1976 | Heilemann |
| 4,033,141 A | | 7/1977 | Gustafsson |
| 4,079,591 A | | 3/1978 | Derby |
| 4,120,157 A | | 10/1978 | Tang |
| 4,347,711 A | | 9/1982 | Noe et al. |
| 4,984,432 A | | 1/1991 | Corey |
| 5,327,987 A | | 7/1994 | Abdelmalek |
| 6,053,418 A | | 4/2000 | Guyer |
| 6,109,047 A | | 8/2000 | Cowans |

FOREIGN PATENT DOCUMENTS

GB        2239489 A        7/1991

OTHER PUBLICATIONS

Wagner, Joseph R.; Koebbeman, William F., Mechanical Technology Inc., Latham, NY, "Hybrid Heat Pump Design and Application", pp. 580-586, New York, US.

(Continued)

*Primary Examiner*—Hoang Nguyen
(74) *Attorney, Agent, or Firm*—Innovation Law Group, Ltd; Jacques M. Dulin, Esq.

(57) ABSTRACT

Recovery of electric power from low-grade waste heat/solar energy, comprising a closed-cycle charged refrigerant loop. Pressurized refrigerant fluid is pumped at ambient temperature through a heat exchanger connected to a waste heat/solar source to extract heat energy during conversion to a high pressure gas. Heated/pressurized refrigerant gas is inlet into an expander to power an output shaft during the expansion of the fluid to a cooled gas at approximately 0 psig. Cooled gaseous refrigerant is condensed to a liquid at low pressure and ambient temperature, and recycled under pressure to the heat exchanger. The expander is a reverse-plumbed gas compressor; the pressurized, hot refrigerant gas is inlet at what is ordinarily its outlet, and the normal inlet becomes the expander end. The refrigerant gas mass flow pressure/temperature drop spins the expander shaft for direct mechanical power take-off, or coupling to a synchronous or inductive generator to produce electricity.

15 Claims, 8 Drawing Sheets

OTHER PUBLICATIONS

H. Forster, Magdeburg, "Gewinnung von Sekundarwarme mit hohen Temperaturen aus verdichteten Gasen", VDI Berichte NR. 1462, 1999, pp. 309-318, DE.

(English) Abstract—1 pg. of book by Painter, Ludwig. "Medium-rating steam circuits using a helical screw expander as energy converter", Final (continued) . . . report to Bundesministerium fur Forschung und Technologie, M.A.N. Technologie, Gmbh, Munich, Germany, Mar. 1989; 195 pgs. (German).

German book by Painter. Ludwig. "Medium-Rating Steam Circuits Using a Helical Screw Expander as Energy Converter," published by MAN Technologie, Gmbh, Munich, Germany, Mar. 1989.

English translation of Painter, "Medium-Rating Steam Circuits Using Helical Screw Expander as Energy Converter," published by MAN Technologie, (cited in A above).

* cited by examiner

SYSTEM AND METHOD FOR GENERATION OF ELECTRICITY AND POWER FROM WASTE HEAT AND SOLAR SOURCES

CROSS-REFERENCE TO RELATED APPLICATION

This is the Regular US and PCT Application of Provisional U.S. Ser. No. 60/360,072 filed Feb. 25, 2002, the priority of which is claimed under 35 US Code § 119.

FIELD OF THE INVENTION

The invention relates to the field of power generation, both direct mechanical and electrical, from waste heat sources, and more particularly to the generation of power from low-grade waste combustion or process heat and solar energy sources. The inventive power generation system and method is realized in the preferred embodiment as a modular, skid-mounted system, but may also be adapted for permanent installation for stationary power generation in association with an industrial or commercial installation. The inventive system employs, as a non-limiting example, recovery of energy from waste heat sources by means of circulation of a working fluid (refrigerant) in a closed loop system wherein drop in pressure is through an expander unit having a power take-off to power an electrical generator, either synchronous of or inductive, or to function as a direct mechanical power take-oil. The preferred expander is a gases compressor modified to run in reverse with hot, pressurized working fluid. The refrigerant loop includes a condenser cooled by a beat sink, preferably a liquid or air-cooled cooling tower. By appropriate selection of the generator, both DC and AC (single or multi-phase) power can be obtained. The system permits cost effective recovery of power from low-grade waste heat sources, and, importantly, the operating power requirement of the inventive system is a minor percentage of power produced, typically less than 10% of the power produced.

BACKGROUND

Currently, enormous amounts of waste heat are generated daily by a wide variety of industrial and commercial processes and operations. These range, typically, from waste heat from space heating operations, process steam boiler waste heat, mechanical and electrical system cooling, and the like. Typically, the waste heat is low grade, that is, it is below about 350° F., and often below about 250° F., a value so low that conventional heat recovery systems do not operate with sufficient efficiency to make recovery of energy from such sources economical. The net result is that vast quantities of waste heat are simply dumped to atmosphere, ground or water thereby contributing to the overall greenhouse effect and effectively raising the cost of operations.

Except for low efficiency photovoltaic cells, solar energy systems produce hot gases or fluids of maximum temperatures well below the range needed to function as power sources. Rather, solar energy is predominantly used for space heating and hot water generation, since those applications only require delivered temperature values on the order of 100–150° F., which are just low enough to match the AH that can be extracted from the solar system output.

Accordingly, there is a pressing need to provide a system and method for cost effective recovery of power from low-grade waste heat and solar systems thereby improving the overall efficiency of power generation from energy sources, including fossil fuels and solar energy, which system can be adapted to stationary power generation, or be configured for portablility as a skid-mounted modular unit.

THE INVENTION

Summary, Including Objects and Advantages:

The invention comprises systems and methods, including computer programs containing operating algorithms (such as PLC-enabled control algorithms), for recovery of power from low-grade waste heat and solar energy devices.

In its broadest implementation, the system of the invention comprises a closed cycle loop of refrigerant pumped initially as a fluid under pressure and at near ambient temperature through a heat exchanger to which the waste heat or solar device output is connected. The refrigerant fluid extracts heat energy from the heat source in the heat exchanger, in the process being converted to a high pressure gas. The heated, pressurized refrigerant gas is inlet into an expander to power an output shaft during the expansion of the fluid to a cooled gas or gas/fluid mix at approximately 0 psig or below. The cooled gaseous refrigerant is further cooled in a condenser, which converts it to a liquid at low pressure and near ambient temperature. The liquid refrigerant then is pumped under pressure back through the heat exchanger to repeat the cycle.

The expander, in a presently preferred embodiment comprises a gas compressor that is modified and plumbed into the inventive system in reverse. That is, a compressor is plumbed to accept a pressurized hot refrigerant gas at an inlet, that is normally the compressor output end. The normal inlet of the compressor, being reversed in the inventive system, becomes the gaseous refrigerant outlet end. The drop in pressure and temperature of the refrigerant gas spins the compressor shaft, which thereby can be employed as a direct mechanical power take off, or coupled to a synchronous or inductive generator to produce electricity.

A preferred type of compressor adapted and modified to function as an expander in the inventive system is a continuous type compressor, rather than a compressor having discreet multi-stages. The preferred expander is an oil-free type, although the current best mode expander employed in the examples below is a screw compressor having an oil loop to lubricate the compressor screws. It is preferred that the compressor bearings be fully sealed, that is, the bearings should not be open to the atmosphere, in order to prevent leakage of the refrigerant gas past the bearings to atmosphere, since the inventive system employs a leak-less charged refrigerant system.

Where a compressor having an oil loop for bearing and/or screw lubrication is used, it is an important aspect of the invention that the expanded refrigerant gases exiting the expander be passed through an oil separator to remove the expander lubricant oil. The separator sump is the reservoir for a pump supplying oil lubricant to the expander bearings and rotors, in addition, the selection and use of expander oil must be compatible with the refrigerant, so as to not chemically or thermodynamically affect the refrigerant properties or system operation. Presently preferred working fluids (refrigerants) include R123, 245FA, R134A, R22, and the like. The preferred oil for the expander includes synthetic, working fluid-compatible oils, such as polyol ester oil (RL 68H).

The condenser functions as a heat exchanger, extracting heat from the refrigerant gas, during which it condenses to a liquid at near ambient temperature. The condenser is cooled by a water-cooled or an air-cooled cooling tower, or other appropriate heat sink, that is sized to provide the ΔT necessary for the full condensation of the mass flow of the gases. The condenser liquid refrigerant outlet is connected to a receiver that functions a holding tank or sump to provide a gravity head for the refrigerant loop pump (the Working Fluid Pump, or WFP).

The refrigerant WFP pump is located on the high pressures side of the system loop, preferably between the receiver and the inlet side of the heat exchanger. The pump, in that location, raises the pressure of the liquid refrigerant to the design parameter for inlet into the heat exchanger while maintaining it near ambient temperature.

The control system of the inventive power generation system includes appropriate temperature, flow, output and condition sensors as well as PLC controller(s) for the pump(s) and valves, and one or more control algorithms for system start-up, steady state operation, shut down, and upset control.

The system power output is controlled by the flow rate of the Working Fluid Pump (WFP). The speed of the WFP is controlled by a Variable Frequency Drive (VFD), with an analog voltage signal generated by the PLC. The WFP is driven so that a selected Expander Input Pressure, selected Expander Input Temperature, and a selected Temperature Difference, ΔT, across the Expander are maintained. There are three loops in the control system. Control System Loop 1, the Expander Input Temperature loop provides a coarse adjustment to the WFP flow rate. Control System Loop 2, the Expander Output Temperature loop, employs the Expander Output Temperature in conjunction with the Expander Input Temperature to provide the temperature difference, ΔT, across the Expander. This temperature difference provides a fine adjustment to the WFP flow rate. Control System Loop 3 modifies the flow rate command signal to the WFP according to the Expander Input Pressure. The several temperature and pressure signals are processed by the CPU of the PLC and may be conditioned by digital representations of thermodynamic equations, lookup tables, or graphs. For dynamic signal conditioning, an optional PID algorithm may be applied. Integrator action is applied to keep the voltage signal to the VFD at the desired level. Standard limit blocks to cover upset conditions, including emergency shutdown, may be used as needed, for example, where source or heat exchanger temperature is too low, the ΔT requirements are not met, the working fluid remains partly in the gaseous state after the condenser, the cooling tower is not running or is inefficient (such as due to conditions of ambient temperature, pressure or humidity in the area where the inventive unit is installed), the expander experiences bearing problems, and the like.

It is preferred to employ a gases bypass, including a solenoid valve that connects between the heat exchanger output (the high pressure side upstream of the expander) to upstream of the condenser (low pressure side of the expander), to assist in start-up, in modulation of expander or/and generator output (e.g., to match grid load requirements), in shut-down, or during emergency stoppage or upset condition prevention or solution. The solenoid valve in the bypass loop is an N.O. valve so that it opens for emergency shut-off or upon loss of power. A process modulator solenoid valve is located in the line between the heat exchanger outlet and the expander inlet, preferably downstream of the bypass line connection. A second, counter-acting emergency shut off valve is located downstream of the modulator valve (upstream of the expander inlet). This valve is N.C. so that it closes during the emergency shut down or upon power loss at the same time the bypass loop emergency valve opens.

For example, in start-up the outlet side of the heat exchanger and the expander are under negative pressure. The inventive system monitors the heat and mass flow of both the refrigerant in the loop and the heat source inlet to the heat exchanger, and may include appropriate feedback, feed-forward or predetermined table, graph or operating curve-following control algorithms.

Any type or size of synchronous or inductive generator appropriate for the input shaft speed of the expander can be employed. For example, DC power can be produced with a DC generator. AC power of single or 3-phase can be produced with an appropriated AC generator. The generator unit includes a conventional speed control and an automatic gateway controller to match the load requirements of the receiving power grid, whether that grid is local, regional or wide area, that is, the grid to which the produced power is provided or sold. The power produced by the inventive system in prototype testing has proven to be extremely clean and free of spikes.

By way of example, and not by way of limitation, current design parameters indicate that the inventive system, sourcing off a waste heat source providing 220° F. gases, steam or water to the heat exchanger will permit the system to produce, via a synchronous generator, 15 KW of power of 120–240 V AC, single or 3-phase at 50–60 Hz at an 8% system power draw at a refrigerant fluid flow of 4.2 gpm at 85° F. at ΔP of 125 psig inlet to the heat exchanger. The 3phase power can also be generated at elevated voltages of 2300V, 4160 V or 13.5 KV with larger expander and generator units in the system loop. Although it is preferred that during steady state operation the inventive system uses a portion of its produced power for system operation (e.g., controller and pumps operation), it should be understood that another source of power is used for start-up, and may be used for general operation.

The system is an ORC (Organic Rankin Cycle) system, in that it operates at lower pressure, typically 100–150 psig on the input side of the expander and 4–5" vacuum on the output side of the expander. The inventive system can be sized to the heat source, and is conveniently skid-mountable so that the system can be provided as a factory-made, modular, shippable unit for simple installation and hook up at a customer site. In such a modular unit form, a unit of the inventive system includes: a PLC or other type of controller, sensors, piping, valves, pumps, expander, generator, oil separator (if required for an oil loop lubricated expander) condenser, bypass and receiver, flanges for connection of the refrigerant pressurized inlet to the heat exchanger and outlet to the expander and flanges for connection to a beat sink for the condenser. The condenser heat sink is preferably a cooling tower that is provided as part of the inventive system on a separate skid, or may be a local, pre-existing cooling tower or other heat sink. Likewise, a heat exchanger can be supplied on a separate skid with flanges for connection of the waste or solar heat fluid source inlets and outlets to the heat exchanger, and the inlet from the system refrigerant pump and the outlet to the expander. Thus, typically the inventive system is provided in pre-manufactured modules of from 1–3 skid-mounted units having mating connections for simple site installation and operational set-up.

In an alternative embodiment, the system of the invention can employ a plurality of heat exchangers in the refrigerant loop. In this embodiment, there are a number of realizations in practice that can be employed. For example, two heat exchangers from different heat sources can be arranged, one upstream of another, so that the first acts as a pre-heater of the refrigerant before it goes through the second which raises the refrigerant temperature to flash it to gas at the selected pressure before entering the inlet side of the expanded. In this arrangement, the pre-heater could be from an even lower grade waste heat source, or the pre-heater could be connected to the outlet from the downstream heat exchanger. In the latter case, the heat exchangers are arranged in series, counter-flow to the direction of flow of refrigerant in the system loop.

Accordingly, the inventive power generation system permits the efficient extraction of waste and solar heat energy from sources as low as about 200–250° F., and the production of electrical and direct shaft power in useful quantities for a wide variety of uses, ranging from supply of compatible power to the electrical grid system to site-used electrical or mechanical power for operation of systems or machines. It should be understood that the mass flow of the refrigerant fluid and type of fluid will be selected to match the work output of the expander to the requirements of a selected induction, or a synchronous, generator having a particular winding factor. For an inductive generator, typically operating in the 1750–1850 rpm range, the field winding is established by the grid, so that the output electrical power can be "pushed" onto the grid (supplied to the grid).

An induction machine, connected to a polyphase exciting source on its stator side, can be made to generate (i.e., the power flow would be reversed compared to that of a motor) if its rotor is driven mechanically by an external means at above synchronous speed and the motor slip becomes negative. That is, an induction motion, if driven above its synchronous speed when connected to an AC power source (external grid or circuit), will deliver power back to the external circuit. The polyphase exciting source will be what produces the field at which the induction motor will generate its power. That is, the induction generator must be operated in parallel with an electric power system, or independently with a load supplemented by capacitors. For independent operation, the speed of the generator must be increased with load to maintain constant frequency; the voltage is not controlled with the capacitors.

The parallel circumstance is created in the induction motor by an overhauling load; it may also be imposed by driving the rotor at greater-than-synchronous speed by the prime mover. In ranges up to about 500 hp, the induction motor may be used as an induction generator, but not as a primary power source. Generation is impossible without an available polyphase source; the source must provide the exciting current component (and thereby the synchronous flux), even though the superimposed induced currents delivery of power to the supply system.

An induction generator delivers an instantaneous 3-phase, R, S, T, short-circuit current equal to the terminal voltage divided by its locked-rotor impedance. Its rate of decay is much faster than that of a synchronous generator of the same rating, corresponding to the sub-transient time constant; sustained short-circuit current is zero. The virtue of an induction generator is its ability to self synchronize when the stator circuit is closed to a power system. Induction generators also have been used for high-speed, high-frequency generators because of their squirrel-cage rotor construction.

BRIEF DESCRIPTION OF THE DRAWINGS

The invention is described in its several aspects in more detail by reference to the drawings in which.

DETAILED DESCRIPTION, INCLUDING THE BEST MODES OF CARRYING OUT THE INVENTION

The following detailed description illustrates the invention by way of example, not by way of limitation of the principles of the invention. This description will clearly enable one skilled in the art to make and use the invention, and describes several embodiments, adaptations, variations, alternatives and uses of the invention, including what are presently believed to be the best modes of carrying out the invention.

The invention is illustrated in the several figures, and is of sufficient complexity that the many parts, interrelationships, and sub-combinations thereof simply cannot be fully illustrated in a single patent-type drawing. For clarity and conciseness, several of the drawings show in schematic, or omit, parts that are not essential in that drawing to a description of a particular feature, aspect or principle of the invention being disclosed. Thus, the best mode embodiment of one feature may be shown in one drawing, and the best mode of another feature will be called out in another drawing. With respect to materials and test data, the best mode embodiment of one aspect or feature may be shown in one example, and the best mode of a different aspect will be called out in one or more other examples, tests, structures, formulas, or discussions.

All publications, patents and applications cited in this specification are herein incorporated by reference as if each individual publication, patent or application is expressly stated to be incorporated by reference.

Figure 1:
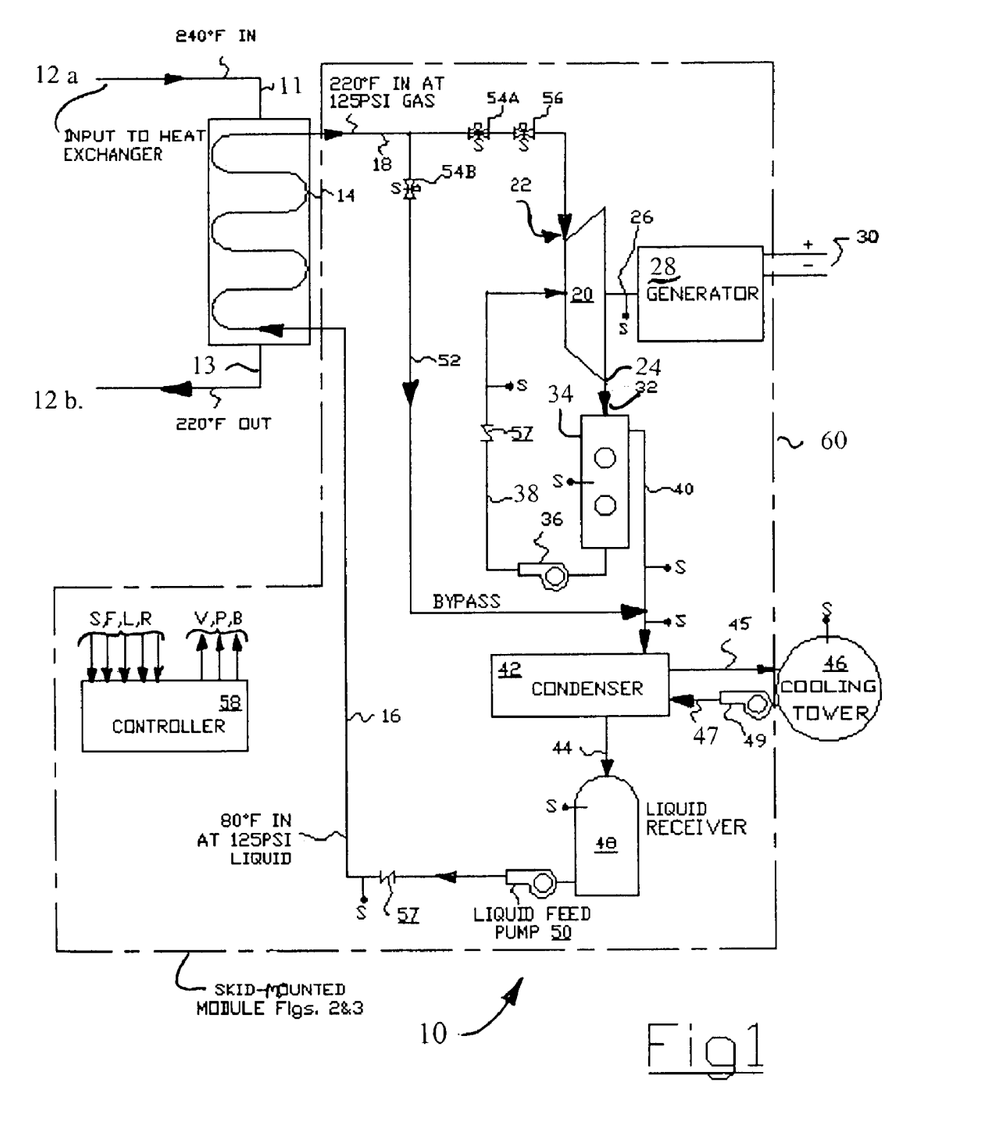
FIG. 1 is an exemplary block diagram of the system components showing the phases, flow rates, temperatures, and pressures in the closed refrigerant loop.

FIG. 1 is an exemplary block diagram of the components of the inventive system and method, showing the phases, flow rates, temperatures, and pressures in the closed refrigerant loop, the bypass loop and the oil separation loop, where an oil-requiring compressor is used as the expander. The overall system 10 is a plumbed, closed loop to which a source 12 provides waste or solar heat to a heat exchanger 14, into which the pressurized, low temperature (e.g., substantially ambient) liquid refrigerant flows via line 16 and out of which heated, pressurized gaseous refrigerant flows via line 18 to an expander 20. As a working example, waste heat input from source 12, e.g., as exhaust steam, hot water, hot flue gas, solar energy or geothermal energy, is input to the heat exchanger 14 at 220° F., and exits at 220° F., while the pressurized working fluid (e.g., R 123) in line 16 is input into the heat exchanger at 80° F., 125 psig, and exits at 220° F. at 125 psig from whence it is fed to an oil free expander 20. In this example the liquid working fluid outlet from the condenser is at 4" W.C. (vacuum). The waste heat and working fluid flow through the heat exchanger in counter-flow, with the cold working fluid at 80° F. entering the bottom of the heat exchanger and exiting out the top at a maximum vapor pressure of 125 psig and maximum temperature of 220° F. The waste heat fluid enters the top of the heat exchanger and cooled fluid out the bottom.

In the present best mode, the expander 20 is a sealed, oil lubricated screw compressor adapted so that the normal outlet end is the inlet 22 for the pressurized hot refrigerant gas. The discharge end 24 of the expander is the normal inlet end. The expander output shaft 26 drives either a power take off unit (e.g., pulley, gear system or the like), not shown, or a generator 28, from which power is selectively supplied to the grid 30 or used locally, as desired.

In the expander the hot gas spins the blades or screws, loosing energy via drop in pressure to near 0 psig and temperature approximately median between the inlet temperature and ambient. The partially cooled gas is discharged via line 32 to oil separator 34, from the sump of which the separated oil is pumped 36 via oil loop line 38 back to the expander 20. The refrigerant gas, now filtered of oil passes via line 40 to the condenser 42 wherein it is cooled to ambient and condensed to a liquid at essentially 0 psig exiting the condenser via line 44. The condenser may be cooled by any suitable heat sink, such as a water or air-cooled cooling tower 46 connected to the condenser 42 via outlet line 45, and inlet line 47 and pump 49. The cooled liquid working fluid/refrigerant exiting the condenser 42 via line 44 passes to a receiver vessel 48 which serves as the reservoir/sump of the high pressure pump 50 which pressurizes and pumps the liquid refrigerant back to the refrigerant loop inlet side of the heat exchanger 14 via line 16.

A bypass loop 52 is connected between the refrigerant loop outlet side of the heat exchanger and the outlet side of the oil separator to assist in start-up, upset condition amelioration and emergency control. Emergency shut-down solenoid valves 54 A, 54 B, modulator valve 56 and check valve 57 assist in operation. The valves, appropriately located sensors (shown as a short line with the letter "S" at the end) in the lines, the heat exchanger, the expander, the oil separator, the condenser, the cooling tower and the receiver are connected to a controller 58. The letters S, F, L and R represent, respectively, pressure and temperature Sensor inputs, Flow Meter inputs, Liquid Level sensor inputs, shaft Rotational speed sensor inputs, and the like other appropriate controller inputs. The controller 58 contains appropriate circuitry and control algorithms for outputs to the system, such as to the Valves, V, the Pumps, P, the Bypass modulating and control valves, B, and the like. The generator unit 28 includes conventional speed control and automatic gateway controller system (not shown) to match the load requirements of the receiving power grid, whether that grid is local, regional or wide area. Appropriate check valves, modulating valves and safety valves are employed as best practices dictate in the circuits.

The invention includes a full computer system for the management of the system and components (e.g., expander, generator, pumps, oil filter, condenser, heat exchanger and cooling tower) status and operation, communications, database operations, history tracking and reporting, processing, and billing. The system of the invention can be linked by land line, wireless or satellite to a remote host site to facilitate operations management for a customer who leases the unit, and for archiving of the system operation and the power production or/and sale to a grid. The computer of the inventive system includes communication tools to generate, transmit, receive, archive, search for and retrieve system operation, subsystem status and power sales.

The processes underlying the site operation, communications, LAN, WAN or Internet implemented management and archives may be implemented in software as computer executable instructions that upon execution perform the operations illustrated in the several figures and described herein. Server(s) of the inventive system may be implemented as one or more computers, configured with server software to host a site on the Internet, to serve static, generally informational Web pages, and to generate and serve dynamic Web pages showing selected performance or status of the system and may be easily tailored to facilitate the power production and distribution management described herein. The dynamic web pages are tailored to individual customers and may be generated on the fly in response to individual requests from customers via their Internet linked access devices (desktop and laptop computers, network computers, etc.).

The computer(s) of the invention can be configured in a system architecture, for example, as one or more PLC controllers, client computers, server computer(s), database (both relational and hierarchical) computer(s), storage computer(s), routers, interfaces, and peripheral input and output devices, that together implement the system and the reporting and management network. A computer used in the inventive system typically includes at least one processor and memory coupled to a bus. The bus may be any one or more of any suitable bus structures, including a memory bus or memory controller, peripheral bus, and a processor or local bus using any of a variety of bus architectures and protocols. The memory typically includes volatile memory (e.g., RAM) and fixed and/or removable non-volatile memory. The non-volatile memory can include, but is not limited to, ROM, Flash cards, hard disk drives including drives in RAID arrays, floppy discs, mini-drives, Zip drives, Memory sticks, PCMCIA cards, tapes, optical drives such as CD-ROM drives, WORM drives, RW-CDROM drives, etc., DVD drives, magneto-optical drives, and the like. The various memory types provide for storage of information and images, including computer-readable instructions, data structures, program modules, operating systems, operating algorithms and other data used by the computer(s).

A network interface is coupled to the bus to provide an interface to the data communication network (LAN, WAN, and/or Internet) for exchange of data among the various site computers, routers, customer computing devices, heat source suppliers and power customers. The system also includes at least one peripheral interface coupled to the bus to provide communication with individual peripheral devices, such as keyboards, keypads, touch pads, mouse devices, trackballs, scanners, printers, speakers, microphones, memory media readers, writing tablets, cameras, modems, network cards, RF, fiber-optic, and IR transceivers, and the like.

A variety of program modules can be stored in the memory, including OS, server system programs, system operating programs, application programs, and other program modules and data. In a networked environment, the program modules may be distributed among several computing devices coupled to the network, and used as needed. When a program is executed, the program is at least partially loaded into the computer memory, and contains instructions for implementing the operational, computational, archival, sorting, screening, classification, formatting, rendering, printing and communication functions and processes described herein.

The customer, operation history, use, and other such data are stored in one or more sets of data records, which can be configured as a relational database (hierarchical, network, or other type of database as well) in which data records are organized in tables. Such records may be selectively associated with one another pursuant to predetermined and selectable relationships, so that, for example, data records in one table are correlated to corresponding records for the power customers and/or heat source suppliers in another table, and the correlation or individual datum is callable for rendering on screen, printout or other activity pursuant to the inventive method aspects of the power generation system described herein.

Figure 2:
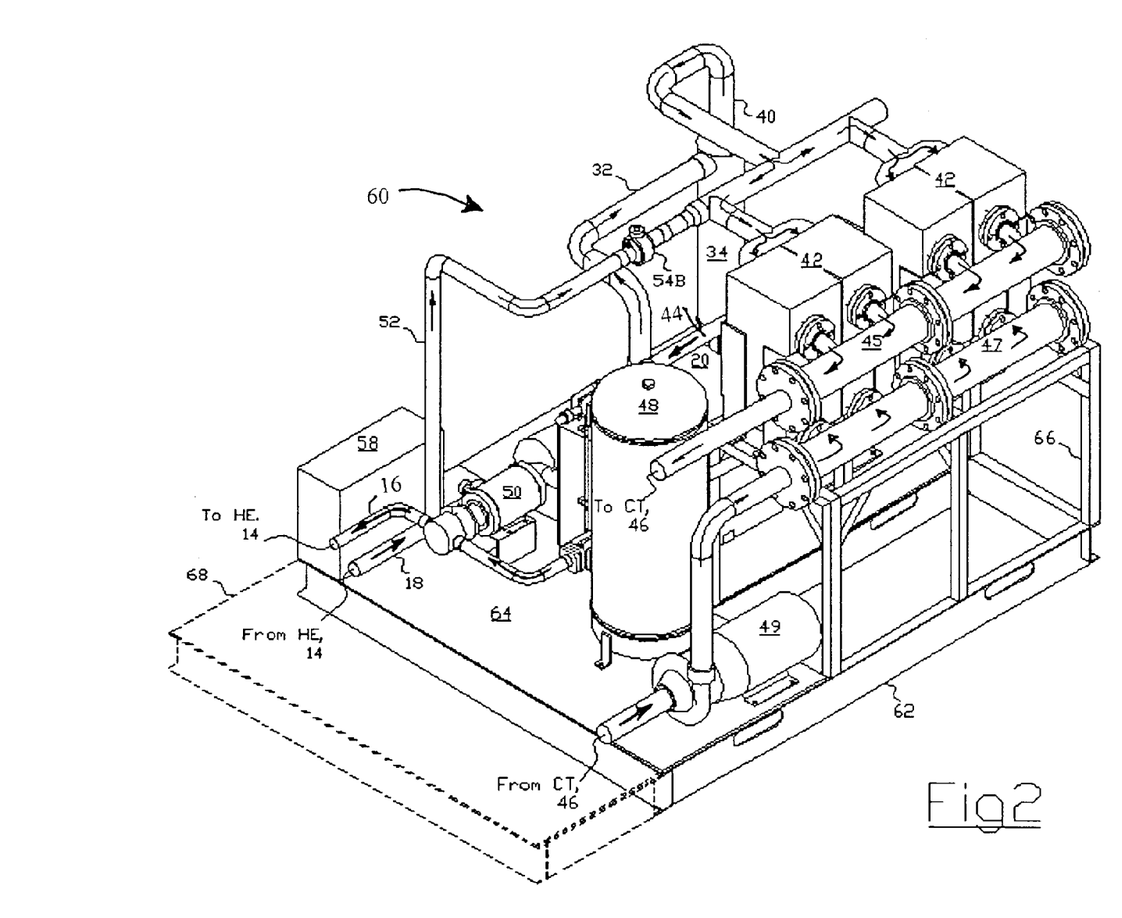
FIG. 2 is an isometric of a skid-mounted core unit of the inventive system from the fluid inlet/outlet side, including a controller, sensors, piping, valves, pumps, expander, generator, oil separator, condenser, bypass and receiver, with flanges for connection of the refrigerant pressurized inlet to the heat exchanger and outlet to the expander, and flanges for connection to a heat sink for the condenser.
Figure 3:
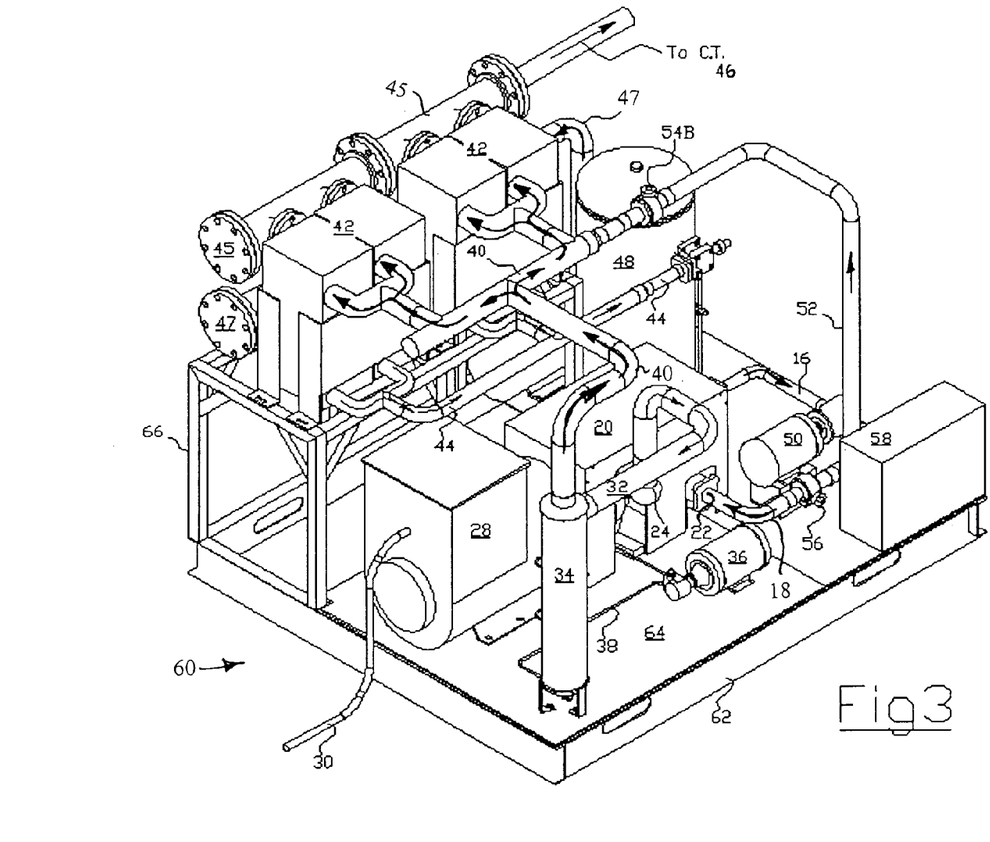
FIG. 3 is an isometric of the skid-mounted core unit of FIG. 2 from the generator side.

FIGS. 2 and 3 are isometric views of a skid-mounted core subsystem 60 of the inventive system 10, as outlined with dash-dot lines in FIG. 1. FIG. 2 is seen from the fluid inlet/outlet side, including a controller, sensors, piping, valves, pumps, expander, generator, oil separator, condenser, bypass and receiver, with flanges for connection of the refrigerant pressurized inlet to the heat exchanger and outlet to the expander, and flanges for connection to a heat sink for the condenser, while FIG. 3 is a rotated isometric view of the skid-mounted core unit of FIG. 2 as seen from the generator side.

The numbering of the components shown in FIGS. 2 and 3 is the same as in FIG. 1. The skid 62 includes a steel girder frame 62 on which is mounted floor plates 64 and appropriate framing 66 for mounting the components. Although the heat exchanger 14 is not present on this skid, it can be mounted on the area 68 (shown in phantom) to the left of the skid 62, 64, on a separate skid (see FIG. 4), or mounted on a pad at the location of the waste heat source.

Figure 5:
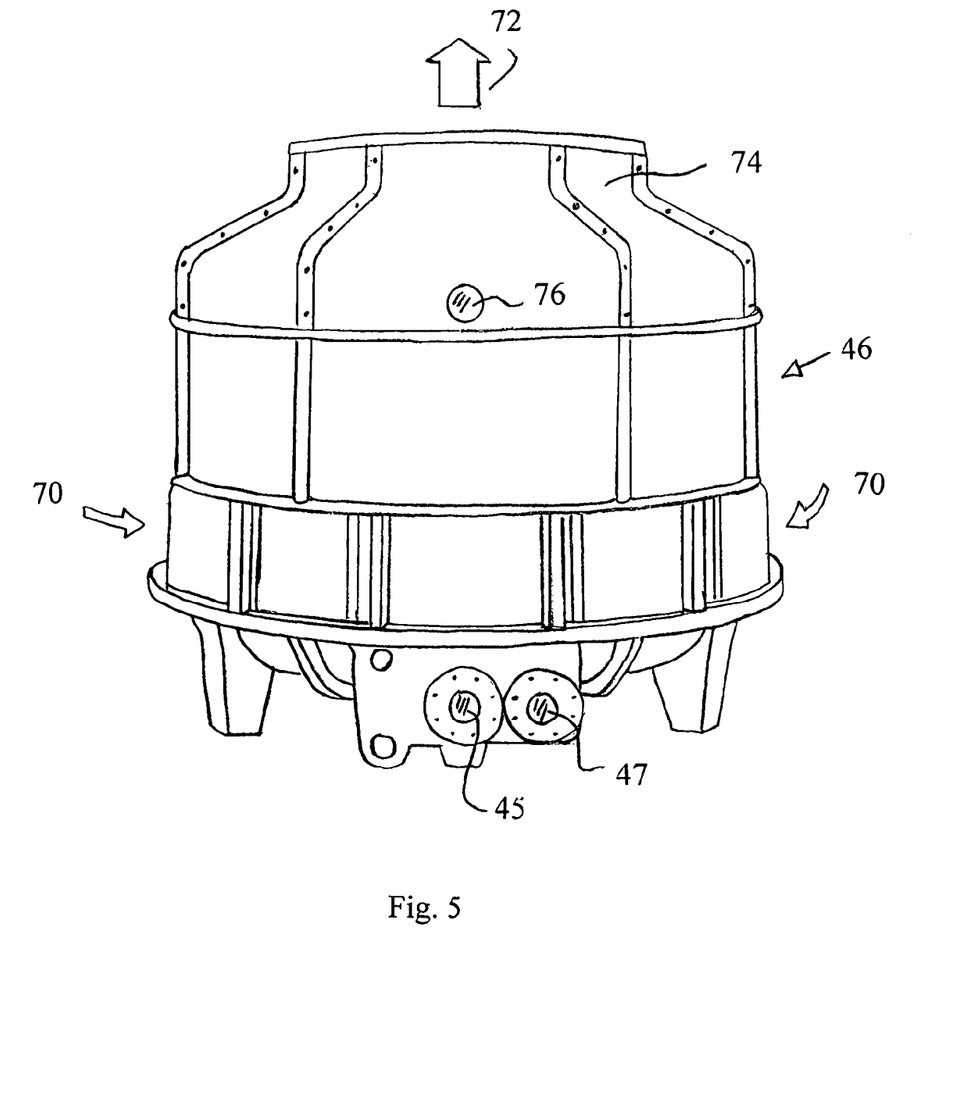
FIG. 5 is an isometric of a skid-mounted cooling tower with flanges for inlet/outlet to the condenser.

The working fluid flow direction is shown by arrows in the piping in the system loop 18, 32, 40, 44, 16, in the bypass loop 52 and in the lubricant oil loop 38. In addition FIG. 2 shows the output of hot water in line 45 going to the cooling tower 46. The return of cold water from the cooling tower 46 is via line 47 and pump 49 to the condenser 42. The cooling tower 46 is seen in FIG. 5. Note that the condenser 42 is shown as a multi-module plate heat exchanger, as shown, by way of example, having four modules with appropriate manifolds for the inlet working fluid lines 40, the working fluid condensate (outlet) lines 44 (see FIG. 3), and the cooling water input lines 47 and hot water output lines 45 (see FIG. 2). Similar skid assemblies can hold the heat exchanger 14 and the cooling tower 46, although either/both may be mounted to permanent pads on-site. It should be understood that the distribution of the components can be in any number of configurations and skids, or the entire system can be floor mounted as a permanent unit in association with the heat source 12.

Figure 4:
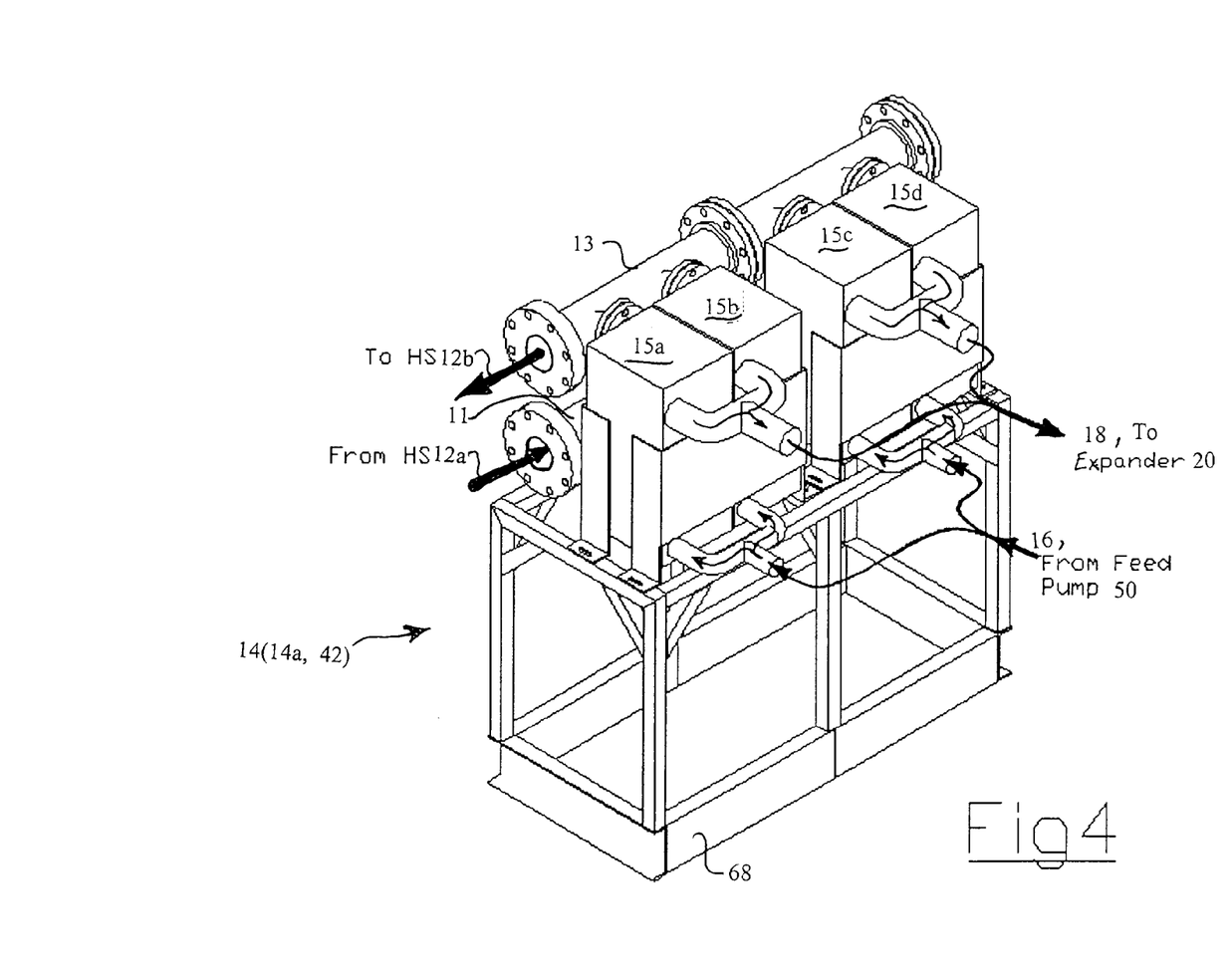
FIG. 4 is an isometric of a skid-mounted primary heat exchanger unit having inlet/outlet flanges for the waste or solar heat source, and inlet/outlet flanges for the refrigerant loop.
Figure 6:
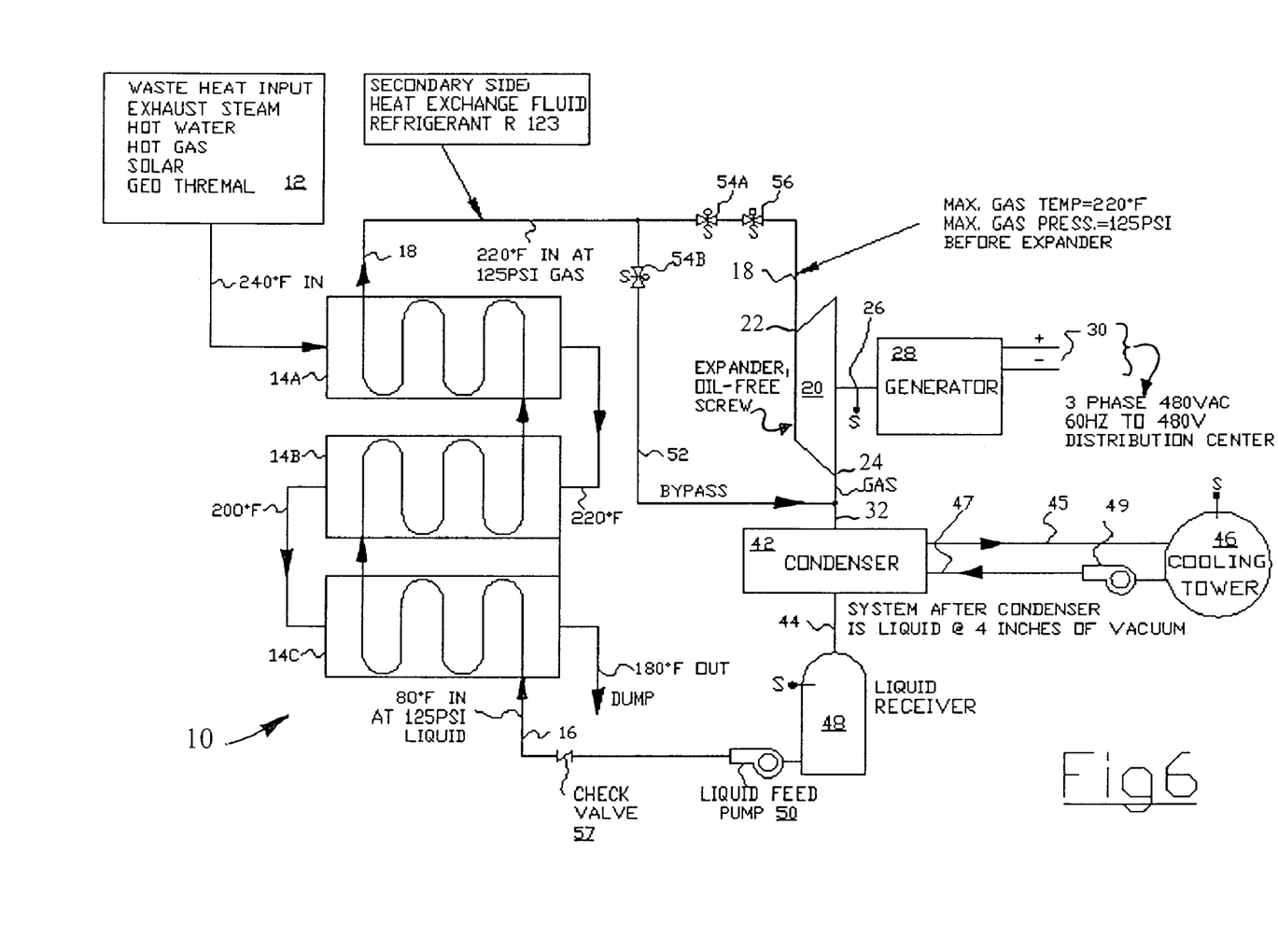
FIG. 6 is a block diagram of a second alternative system configuration employing staged, serial heat exchangers that increases the efficiency of power production.

FIG. 4 is an isometric view of an exemplary heat exchanger, such as 14 in FIG. 1, or 14A–14C in FIG. 6, and may also be the condenser 42 of FIGS. 1 and 6. Inlet pipe 11 includes manifolds for distributing the hot fluid (gases or liquid) from the heat source 12 (not shown) to the modular plate units 15a, 15b, 15c and 15d. The outlet pipe 13 returns the cooled heat source fluid to the heat source or is dumped. On the facing side of FIG. 4 the inlet lines and manifold piping 16 from the high pressure liquid working fluid feed pump 50 is shown entering the bottom of the plate heat exchanger units 15a–15d, and outlet gaseous working fluid lines 18 exit at the top. Note that the respective fluid flow lines are arranged to be thermally counter-flow. The heat exchanger assembly is mounted on skit 68 which may be a separate skid, or an integral part of the main skid 62, as best shown in FIG. 2.

FIG. 5 is an illustration of a suitable conventional cooling tower 46, in this example, an air cooled tower containing an internal fan (not shown) with air inlet 70 at the bottom, and the hot air 72 exhausting out the top cone 74. Flanges are shown at the bottom for inlet 45 of water from the condenser 42 (FIGS. 1–4 and 6) and the cooled return water outlet at 47. Viewing port 76 permits inspection during operation. The pump 49 is on skid 62 (FIG. 2).

FIG. 6 is a block diagram of a second alternative configuration of the inventive system employing staged, serial heat exchangers that increases the efficiency of power production. Note also that an oil-free screw expander is employed, as a consequence of which the oil separator and the lubrication loop (items 34, 36, 38 in FIG. 1) are eliminated. Note in FIG. 6 the counter-flow of the waste heat fluid, is inlet in Stage 1 to heat exchanger 14 A at 240° F., exits from Stage 1 and enters heat exchanger Stage 2, 14 B, at 220° F., exits Stage 2 and enters heat exchanger Stage 3, 14 C, at 200° F., and exits Stage 3 at 180° F. The converse rise in temperature of the input working fluid in line 16 is from 80° F. at 125 psig (liquid) is to 220° F. as the maximum temperature and 125 psig maximum pressure as a working fluid (gas) for input into the expander 20.

Figure 7:
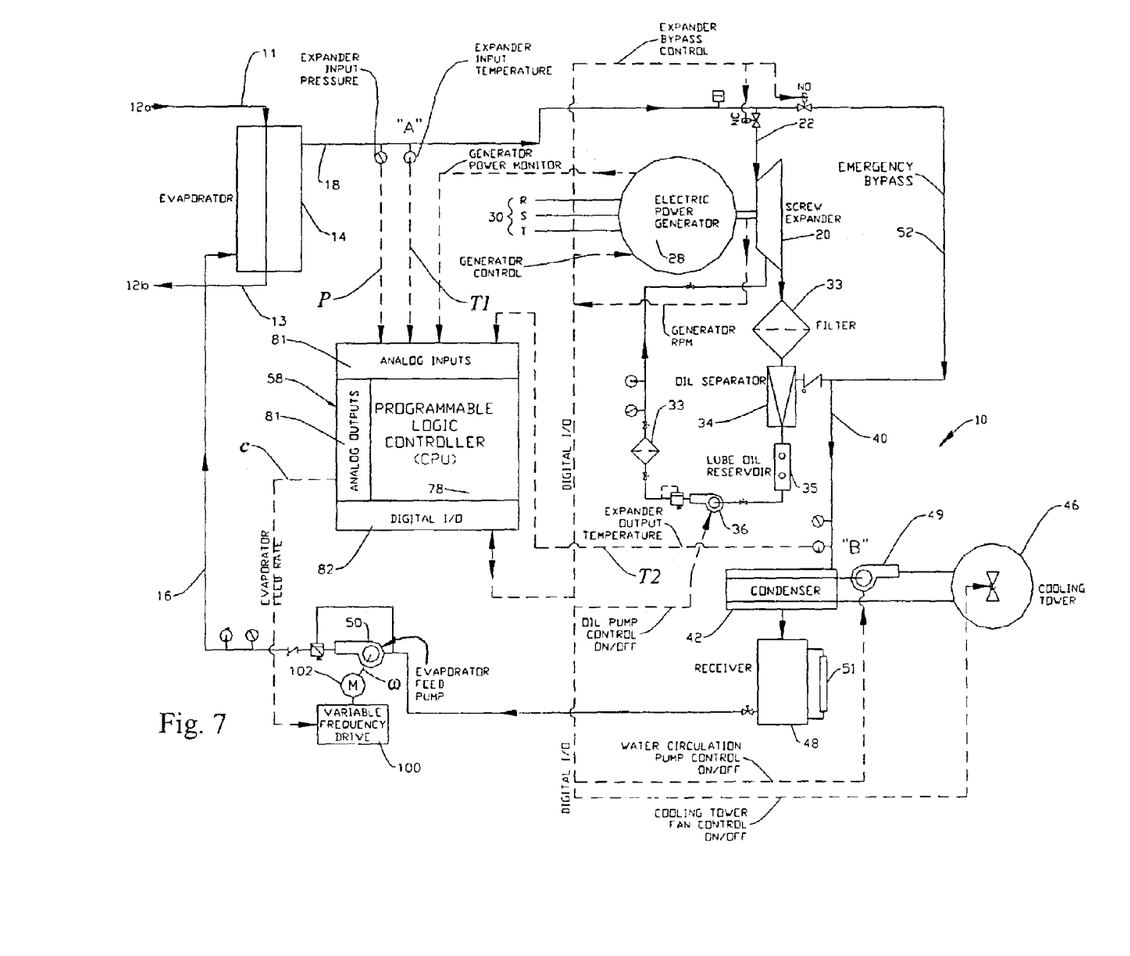
FIG. 7 is a block diagram of the inventive system showing the integration of a PLC controller, and represents a commercial configuration of a system unit, the test results of which are reported in the Industrial Applicability section below.
Figure 8:
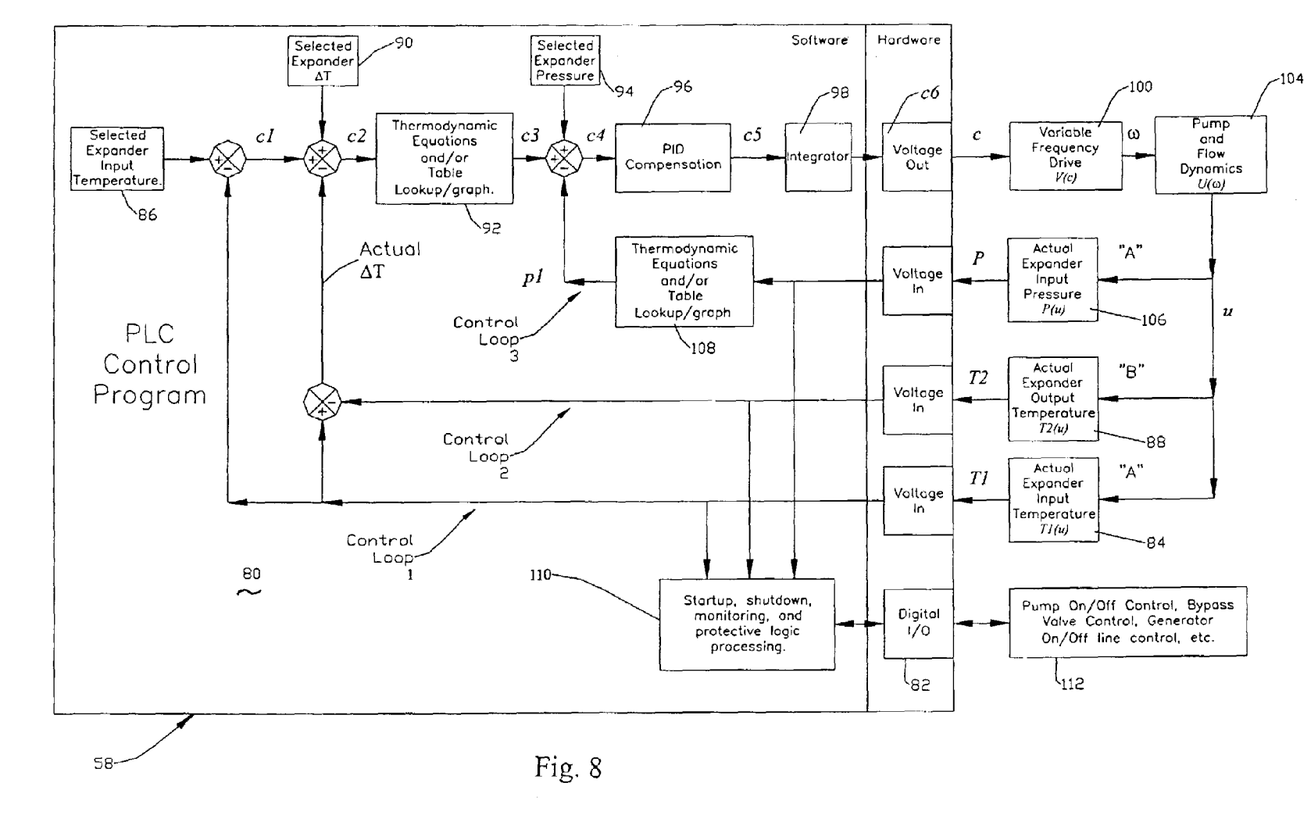
FIG. 8 is a schematic of an exemplary control system overall architecture, showing the software, hardware and logic and signal flow for system operation control.

Referring now to FIGS. 7 and 8, these related figures show, respectively, the integration of a PLC controller in the inventive system, and the overall architecture of the system control, including software and hardware components, and logic and signal flow paths.

In this example, the system employs a lubricated expander, e.g., a Bitzer screw compressor reversed to operate as an expander, and the lube oil circuit includes several filters 33 and a reservoir 35 downstream of the separator 34. The working fluid circuit receiver 48 downstream of the condenser may include a sight gauge 51. The controller 58 is a PLC unit, comprising a PLC CPU 78, analog inputs and outputs 81 and digital I/O block 82. The dashed lines represent the various control lines to the system components as shown, and the arrow heads on the lines identify whether inputs, outputs or both to and from the PLC 58 and the respective components. In addition the dashed lines are labeled to identify the control functionality, and as such, are clearly mappable to the architecture and logic of FIG. 8.

The FIG. 7 component numbering corresponds to FIG. 1, and the various symbols for the conventional line valves, gauges, switches, pumps, fans and filters are as follows:

| SYMBOLS: | |
|---|---|
| ⌀ | PRESSURE GAUGE |
| ⌀ | TEMPERATURE GAUGE |
| ◇ | FILTER |
| ⌐⌐ | PRESSURE RELIEF |
| ⋈ | CHECK VALVE |
| NO ⋈ | SOLENOID VALVE NORMALLY OPEN |
| ⋈ | SHUT OFF VALVE |
| NC ⋈ | SOLENOID VALVE NORMALLY CLOSED |
| ⌁ | PUMPS |
| ⌁ | FAN |
| Ⓜ | MOTOR |

With reference to both FIGS. 7 and 8, the PLC program 80 includes an algorithm that controls the output power of the system. It uses floating-point binary representations of the pressure and temperature signals. These signals are sampled and the algorithm is computed on a periodic basis. The "Selected" values mentioned are pre-selected based on the system requirements, namely the expander output work required to drive the system generator and the thermodynamic properties of the system as a whole and the working fluid. In the description that follows, we start with numbers to identify certain blocks, and then the control logic and signal flow can be followed by the function symbols keyed to the figures.

The Actual Expander Input Temperature $T1(u)$, 84, measured at "A" on FIG. 7 (the gas output line 18 from the Evaporator 14), is subtracted from a Selected Expander Input Temperature, 86, to form the error signal c1;

The Actual Expander Input Temperature, $T1(u)$, 84, is subtracted from the Actual Expander Output Temperature $T2(u)$, 88, measured at "B" in FIG. 7 (in line 40, just upstream of the condenser 42) to form the Actual Temperature Difference Across the Expander, Actual $\Delta T$;

The Actual Temperature Difference Across the Expander, Actual $\Delta T$, is subtracted from the Selected Expander $\Delta T$, 90, and the error signal c1, to form the error signal c2;

The error signal c2 optionally is applied to digital representations of thermodynamic equations, lookup tables, or graphs, 92, as needed for compensation, the output of which is c3;

The Actual Expander Input Pressure, $P(u)$, 106, is applied to digital representations of thermodynamic equations, lookup tables, or graphs, 108, the output of which is p1.

p1 is then subtracted from the Selected Expander Pressure, 94, and the error signal c3 to form the error signal c4. c4 is applied to an optional PID (proportional integral derivative) signal conditioning and compensation algorithm, 96, to form c5.

c5 is applied to an integrator algorithm, 98, to form the signal c6.

c6 is a floating-point, binary number representation of the control signal to the VFD, 100. This control signal to the VFD may be a voltage, a current, or a serial bit stream. In the diagram shown, it is a voltage. The control signal in binary form is applied to a Digital-to-Analog module on the PLC bus. This modules' output voltage signal, c, is connected to the input of the VFD 100.

In turn, the VFD 100 drives the motor 102 of pump 50 (see FIG. 7) by modulating the pump motors' power input. The pump motors' speed is modulated by the VFD output, which supplies the pump motors' power as well. What is important for this discussion is that in FIG. 8, the voltage signal, c, is converted to a pump speed, $\omega$, by the VFD's transfer function, $V(c)$. The flow rate of the working fluid is represented by u. Mass flow can easily be calculated from the flow rate for any given working fluid. Flow rate is related to the pump speed by the transfer function, $U(\omega)$, 104. The relationship between the working fluid flow rate and the pressure at point A is represented by the transfer function, $P(u)$, 106. The voltage in, P, is related to thermodynamic equations 106 as noted above, completing this Third Control Loop.

The relationships between the working fluid flow rate and the pressure at point A, and the temperature at points A and B are represented by the transfer functions $P(u)$, $T1(u)$ and $T2(u)$, 106, 84 and 86, respectively. Although the precise nature of these transfer functions can be quite complex and non-linear over a large range, as long as the transfer functions are piecewise-linear in the control range, the precise nature of the transfer functions need not be known.

The point A temperature and pressure, and the point B temperature are sensed using temperature sensors, as indicated in FIG. 7. These sensors may be thermocouples with conditioning circuitry, or a self-contained transducer. The output of these sensors/transducers can be a voltage or current proportional to the measured temperature or a serial bit stream representation of temperature. In the FIGS. 7 and 8 shown, this signal is a voltage. The signals T1, T2, and P are converted to floating-point binary representations using an Analog-to-Digital module on the PLC bus section of PLC CPU 78.

As shown in FIG. 8, the PLC program also performs logic operations 110 for startup/shutdown sequencing, monitoring, and protective processing for the complete system, using the signals mentioned, along with other digital or analog inputs for control 112 of the various pumps, valves, motors and the generator.

INDUSTRIAL APPLICABILITY

It is evident that the power generation system of the invention can be easily realized by those skilled in the art using conventional equipment and has wide applicability in industry and in commercial establishments that have waste heat, particularly low grade heat of temperatures on the order of as low as 200–250° F., and for solar systems or geothermal sources generating a fluid of similar thermal value. Since almost all industrial processes, and many commercial establishments generate heat for their processes or operations and for space heating, there are readily available heat sources that the inventive system can serve, particularly in the skid-mounted form factor disclosed herein.

The inventive system is not intended to apply to automotive vehicles. However, being in modular unit construction and easily retrofit into existing retail, industrial or power generation system, the inventive system can be easily adapted for waste heat from turbine off gases, some power plant flue gas sources, nuclear reactor coolant loops, or ship-based heat sources, such as ship steam boilers, turbine cooling loops or nuclear reactor waste heat.

The inventive system can be easily sized to utilize the waste heat from power plants, as a type of co-generation add-on, for example, utilizing the low grade heat from the flue gases of coal, gas or oil-fired power plants, or the heated cooling water from a nuclear power plant.

By way of illustration of the industrial applicability of the inventive system, an actual example of the operation of a skid-mounted system of FIGS. 2–5, connected as shown in FIG. 1 is as follows (all locations refer to FIG. 1, temperatures in °F., for an oil lubricated screw expander powered by R123 refrigerant to drive a standard utility inductive-wound, 0.85 power factor generator, to provide power out of generator 28, 30 amp, 3 phase, 480 V±10 V @60 Hz±2.5 Hz):

| | |
|---|---|
| Source Water Temp, Out (at 12a) | 216° F. |
| Source Water Return (at 12b) | 201° F. @ 26 psig |
| Evaporator (Heat Exchanger) (at 11) | 212° F. |
| Evaporator (Heat Exchanger) (at 13) | 201° F., 75–85 gpm @ 11 psig |
| Refrigerant Gas T to Expander (at 18, 22) | 208° F., 74–92 psig |
| Refrigerant Gas T after Separator (at 40) Upstream of Condenser | 108° F., at 0 psig |
| Refrigerant flow in WF Loop 16 | 12–13 gpm |
| Refrigerant liquid T out of WFP 50 | 62° F. |
| Power Generated (at 30, FIG. 1) | 22 KWH at 82 psig (at 18, 22) |
| Power Generated (at 30, FIG. 1) | 27.5 KWH at 92 psig (at 18, 22) |

The power generated is actual test data, and reflects losses of KW through typical factors (e.g., loss of refrigerant through seals, contamination, and the like). Clearly, output of around 25 KWH of 480 V/30 Amp power from 200–220° F. waste heat, a typical industrial or retail operation waste heat or power plant waste heat value, is significant, particularly considering the number of such sources. 25 KWH will power some 8–10 homes or substantial retail or industrial operations.

It should be understood that various modifications within the scope of this invention can be made by one of ordinary skill in the art without departing from the spirit thereof. We therefore wish this invention to be defined by the scope of the appended claims as broadly as the prior art will permit, and in view of the specification if need be, including equivalents thereof that are or will be well recognized in this art.

PARTS LIST

This Parts List is Provided as an Aid to Examination and May be Canceled Upon Allowance

| | |
|---|---|
| 10 | Inventive Power Generation System |
| 11 | Line input from Heat Source to Heat Exchanger |
| 12 | Heat Source |
| 13 | Line output from Heat Exchanger to Heat Source |
| 14 | Heat Exchanger (stages 14 A, B and C) |
| 15a–15d, | Plate Heat Exchanger modules |
| 16 | Line (input, HiP, liquid working fluid/refrigerant) |
| 18 | Line (output, HiP gaseous working fluid) |
| 20 | Expander |
| 22 | Expander Inlet |
| 24 | Expander Outlet |
| 26 | Outlet Shaft |
| 28 | Generator |
| 30 | Power Grid |
| 32 | Line for oil and gaseous Working Fluid |
| 33 | Filter |
| 34 | Oil Separator |
| 35 | Lube Oil Reservoir |
| 36 | Oil Pump |
| 38 | Oil Loop |
| 40 | Line for gaseous working fluid |
| 42 | Condenser |
| 44 | Line for liquid working fluid |
| 45 | Line to Cooling Tower |
| 46 | Cooling Tower |
| 47 | Line from Cooling Tower |
| 48 | Receiver Vessel |
| 49 | Cooling fluid pump |
| 50 | High pressure working fluid pumps |
| 51 | Sight Gauge |
| 52 | Bypass Loop |
| 54 | Shutdown Valve(s) A and B |
| 56 | Modulator Valve(s) A and B |
| 58 | Controller (PLC) |
| 60 | Skid Mounted Module |
| 62 | Steel girders |
| 64 | Skid top deck |
| 66 | Component framework |
| 68 | Extension of skid 62 for heat exchanger |
| 70 | Inlet cooling air to cooling tower |
| 72 | Outlet hot air from cooling tower |
| 74 | Cooling tower outlet cone |
| 76 | viewing port |
| 78 | PLC CPU |
| 80 | PLC Control Program |
| 81 | Analog Inputs & Outputs |
| 82 | Digital I/Os. |
| 84 | Actual Expander Input T, T1 (u) |
| 86 | Selected Expander Input T |
| 88 | Actual Expander Output T, T2 (u) |
| 90 | Selected Expander ΔT |
| 92 | Compensation Equations/Tables/graphs |
| 94 | Selected Expander Pressure |
| 96 | PID Compensation Algorithm |
| 98 | Integrator |
| 100 | VFD |
| 102 | Pump Motor |
| 104 | Pump and Mass flow dynamics |
| 106 | Transfer function (Pressure) |
| 108 | Compensation Equations, etc. |
| 110 | Start up/Shutdown etc Logic |
| 112 | Pump/Value Control etc |
| B = | Bypass system control |
| S = | Sensors (temperature and pressure) |
| F = | Flow meter sensors |
| L = | fluid Level sensors |
| R = | shaft Rotation speed sensors |
| V = | Valves |
| P = | Pumps |

We claim:

1. System for generation of electricity from waste heat and solar sources, comprising in operative combination:
   a) a closed loop, refrigerant working fluid circuit comprising:
      i) at least one heat exchanger providing heat energy from a waste heat or solar source to convert said working fluid from a liquid pressurized refrigerant to a heated gas refrigerant under pressure;
      ii) an expander driven by said heated, pressurized refrigerant working fluid to produce power to an output shaft, said working fluid pressure being thereby reduced, and said expander comprises a screw compressor that is oriented to run in reverse in said circuit so that said refrigerant working fluid drives said output shaft while dropping in temperature, and wherein said expander is selected from a continuous and a multi-stage screw compressor;
      iii) a generator driven by said screw compressor output shaft to produce electricity, said generator is selected from an induction-type generator and a synchronous-type generator;
      iv) a condenser for reducing said lowered pressure refrigerant working fluid gas temperature thereby converting the working fluid gas to a liquid at the condensation temperature or below of said working fluid;
      v) a pump for pressurizing and circulating said refrigerant working fluid in said circuit, said pump is driven by a variable frequency drive; and
      vi) conduits interconnecting said heat exchanger, said expander, said condenser and said pump in a closed loop refrigerant circuit, said working fluid is selected from R123, 245FA, R134A, R22, organic refrigerants, and said circuit includes an emergency refrigerant working fluid gas bypass around said expander; and
   b) a controller for monitoring said generator and selected temperatures and pressures of the refrigerant working fluid in pressurized liquid or gas form in said circuit, and for providing control signals to control said pump variable frequency drive, screw compressor and generator.

2. System as in claim 1 wherein said screw compressor includes oil-lubricated bearings in the case of a dry screw compressor, and a secondary lube oil separation and recycle loop in the case of an oil lubricated compressor screws.

3. System as in claim 1 wherein said working fluid circuit includes a filter on the outlet side of said expander.

4. System as in claim 1 wherein said heat exchanger is multi-stage.

5. System as in claim 1 wherein said circuit includes a receiver downstream of said condenser to provide a reservoir for said cooled fluid refrigerant and a head for said working fluid pump.

6. System as in claim 5 wherein said condenser is cooled by a water-cooled heat exchanger comprising at least one of a cooling tower and a cooling water sump system.

7. System as in claim 1 wherein said controller includes a PLC having at least one control loop, temperature and pressure inputs representing measurements of actual expander input pressure and temperature and expander outlet temperature generator rpm and power monitoring condenser control, output to said variable frequency drive, a program including pre-selected expander input temperature, pressure and ΔT, and outputs for control of pump on/off, bypass valve control, and generator on/off-line control.

8. System for generation of electricity or direct shaft power from waste heat and solar sources, comprising in operative combination:
   a) a portable skid, on which are mounted a closed, refrigerant working fluid circuit comprising:
      i) input and output pressurized refrigerant conduits for connection to at least one heat exchanger providing heat energy from a low grade waste heat or solar source to convert said refrigerant working fluid from a liquid to a heated gas under pressure;
      ii) an expander driven by said heated, pressurized refrigerant working fluid to produce power to an output shaft, said working fluid pressure being thereby reduced, and said expander comprises a screw compressor oriented to run in reverse in said circuit so that said refrigerant working fluid, during drop in pressure while passing through said compressor, drives said output shaft:
      iii) said output shaft is coupled to at least one of an induction or synchronous-type generator to produce electricity and a direct power take off coupleable to a load to do work;
      iv) a condenser for reducing said lowered pressure refrigerant working fluid gas temperature thereby converting the refrigerant working fluid gas to a liquid at the condensation temperature or below of said working fluid;
      vii) a pump for pressurizing and circulating said refrigerant working fluid in said circuit, said pump is driven by a variable frequency drive; and
      viii) conduits interconnecting said heat exchanger input and output, said ex-pander, said condenser and said pump in a closed loop circuit, said working fluid is selected from R123, 245FA, R134A, R22, organic refrigerants, and said circuit includes an emergency refrigerant working fluid gas bypass around said expander; and
   b) a controller for monitoring said output shaft and selected temperatures and pressures of the refrigerant working fluid in liquid or gas form in said circuit and for providing control signals to control said pump variable frequency drive and thereby the output of said shaft.

9. Method of generation of direct shaft power or electricity from waste heat or solar sources, comprising the steps in operative sequence of:
   a) providing a waste heat source to a pressurized liquid refrigerant working fluid to heat said working fluid to a higher temperature, pressurized gas, said working fluid is selected from R123, 245FA, R134A, R22, organic refrigerants;
   b) pumping said refrigerant in a closed refrigerant working fluid loop circuit said pump being driven with a variable frequency drive;
   c) driving an expander having an output shaft with said heated, pressurized gas thereby reducing the pressure of said gas, said expander comprising a screw compressor that is oriented to run in reverse in said circuit so that said refrigerant working fluid drives said output shaft while dropping in temperature and pressure;
   d) driving at least one of a synchronous or induction generator to produce electricity or a power take off with said output shaft;
   e) condensing said refrigerant working fluid gas to a liquid at its condensation temperature, or below:

f) recycling said refrigerant working fluid liquid under pressure to said waste heat source in a closed working fluid circuit; and g) monitoring and controlling the flow, pressures and temperatures of said working fluid liquid and gas in said circuit to generate electricity or direct power from said expander output shaft, said monitoring and control steps include monitoring said shaft and selected temperatures and pressures of the working fluid in liquid or gas form in said circuit and for providing control signals to control said pump variable frequency drive, said condenser and said generator.

10. Method as in claim 9 wherein said circuit includes an emergency refrigerant working fluid gas bypass around said expander, and said recycle step comprises pumping said liquid refrigerant working fluid under pressure through a heat exchanger to obtain heat from said waste heat source.

11. Method as in claim 9 wherein said monitoring ard control steps include providing a PLC having at least one control loop, temperature and pressure inputs representing measurements of actual expander input pressure and temperature and expander outlet temperature, generator or expander output shaft rpm and power monitoring, control of cooling of said expander output gas to a liquid, output to said variable frequency drive, a program including pre-selected expander input temperature, pressure and ΔT, and outputs for control of pump on/off, control of valves and control of generator on/off-line status.

12. Method of generation of direct shaft power or electricity from waste heat or solar sources, comprising the steps in operative sequence of:

a) providing a waste heat source to a liquid working fluid to heat said working fluid to a higher temperature, pressurized gas;

b) driving an expander having an output shaft with said heated, pressurized gas thereby reducing the pressure of said gas, and said expander comprises a screw compressor oriented in reverse in said circuit so that said working fluid gas drives said compressor output shaft;

c) condensing said working fluid gas to a liquid at its condensation temperature, or below;

d) recycling said working fluid liquid to said waste heat source in a closed working fluid circuit, said recycling comprises pumping with a controllable variable frequency drive said liquid working fluid under pressure through a heat exchanger to obtain heat from said waste heat source; and e) monitoring and controlling the pressures and temperatures of said working fluid liquid and gas in said circuit to generate electricity or direct power from said expander output shaft, said monitoring and controlling include monitoring said expander output shaft and selected temperatures and pressures of the working fluid in liquid or gas form in said circuit and providing control signals to control said pump, expander and generator, including providing a PLC having at least one control loop, temperature and pressure inputs representing measurements of actual expander input pressure and temperature and expander outlet temperature, generator or expander output shaft rpm and power monitoring, control of cooling of said expander output gas to a liquid, output to said variable frequency drive, a program including pre-selected expander input temperature, pressure and ΔT, and outputs for control of pump on/off, control of valves and control of generator on/off-line status.

13. System as in claim 1 wherein said expander, generator, condenser, pump and refrigerant fluid circuit conduit components are mounted on a portable skid.

14. System as in claim 13 wherein said waste heat supplied by said heat exchanger is low grade waste heat.

15. System as in claim 1 wherein the refrigerant pressure input into said expander is below about 150 psig, and the refrigerant gas pressure out of said expander is up to about 5" vacuum.

* * * * *